United States Patent
Martyn

(10) Patent No.: US 8,713,476 B2
(45) Date of Patent: *Apr. 29, 2014

(54) COMPUTING DEVICE WITH IMPROVED USER INTERFACE FOR APPLICATIONS

(71) Applicant: Core Wireless Licensing S.a.r.l, Luxembourg (LU)

(72) Inventor: Mathieu Kennedy Martyn, London (GB)

(73) Assignee: Core Wireless Licensing S.a.r.l, Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 14/063,544

(22) Filed: Oct. 25, 2013

(65) Prior Publication Data

US 2014/0082567 A1    Mar. 20, 2014

Related U.S. Application Data

(63) Continuation of application No. 13/860,143, filed on Apr. 10, 2013, which is a continuation of application No. 10/343,333, filed as application No. PCT/GB01/03387 on Jul. 27, 2001, now Pat. No. 8,434,020.

(30) Foreign Application Priority Data

Jul. 28, 2000    (GB) .................................. 0019459.7

(51) Int. Cl.
*G06F 3/0481*    (2013.01)
*G06F 3/0484*    (2013.01)

(52) U.S. Cl.
USPC ......................................... 715/808; 715/811

(58) Field of Classification Search
CPC .... G06F 3/0481; G06F 3/0482; G06F 3/0483
USPC .................................................. 715/808, 811
See application file for complete search history.

(56) References Cited

U.S. PATENT DOCUMENTS 5,815,142 A * 9/1998 Allard et al. .................. 345/173
6,104,399 A    8/2000 Volkel
(Continued)

FOREIGN PATENT DOCUMENTS

EP    0607731 A2    7/1994
EP    0844553 A1    5/1998
(Continued)

OTHER PUBLICATIONS

Japanese literature (bibliography: Arioka Osamu, Windows CE carnival, using fast- and light-mobile phones toughly:, Mobile PC, Softbank Corp., Mar. 1, 1999, vol. 5, No. 3, p. 82-83), 14 pages total (numbered 2/15 through 15/15).

(Continued)

*Primary Examiner* — Thanh Vu
(74) *Attorney, Agent, or Firm* — Ziegler IP Law Group, LLC

(57) ABSTRACT

A computing device includes a display screen, where the computing device is configured to display on the screen a menu listing one or more applications, and to display on the screen an application summary that can be reached directly from the menu, where the application summary displays a limited list of data offered within the one or more applications, each of the data in the list being selectable to launch the respective application and enable the selected data to be seen within the respective application, and where the application summary is displayed while the one or more applications are in an un-launched state.

29 Claims, 1 Drawing Sheet

(56) References Cited

U.S. PATENT DOCUMENTS

| | | |
|---|---|---|
| 6,121,968 A * | 9/2000 | Arcuri et al. .................. 715/825 |
| 6,144,863 A | 11/2000 | Charron |
| 6,160,554 A * | 12/2000 | Krause .......................... 715/804 |
| 6,456,841 B1 | 9/2002 | Tomimori |
| 6,512,525 B1 | 1/2003 | Capps et al. |
| 6,570,596 B2 | 5/2003 | Frederiksen |
| 6,781,611 B1 | 8/2004 | Richard |

FOREIGN PATENT DOCUMENTS

| | | |
|---|---|---|
| EP | 0891066 A2 | 1/1999 |
| EP | 0946028 A2 | 9/1999 |
| GB | 2335822 A | 3/1998 |
| GB | 2325065 A | 11/1998 |
| JP | 3-149666 A | 6/1991 |
| JP | 07-281856 A | 10/1995 |
| JP | 09-128189 A | 5/1997 |
| JP | 09-251371 | 9/1997 |
| JP | 09-269883 A | 10/1997 |
| JP | 10-254598 A | 9/1998 |
| JP | 11-15582 A | 1/1999 |
| JP | 11-74985 A | 3/1999 |
| JP | 11-196158 A | 7/1999 |
| JP | 2000036856 A | 2/2000 |

OTHER PUBLICATIONS

English translation of Japanese literature (bibliography: Arioka Osamu, Windows CE carnival, using fast- and light-mobile phones toughly:, Mobile PC, Softbank Corp., Mar. 1, 1999, vol. 5, No. 3, p. 82-83, 8 pages total.

IBM Technical Disclosure Bulletin; vol. 37; No. 02B; Feb. 1994; "Reorganizing Menu Hierarchy to Best Fit the Individual User"; pp. 349-350, 2 pages total.

Japanese Office Action dated May 9, 2013 (3 pages) in parallel Japanese Divisional Application No. 2011-261132 together with an English translation of same (4 pages).

Machine translation of JP 09-269883, published Oct. 14, 1997, Seiko Epson Corp. (30 pages).

English Abstract of JP 07-281856, published Oct. 27, 1995, Hitachi Ltd. (1 page).

English Abstract of JP 11-196158, published Jul. 21, 1999, NEC Mobile Commun Ltd. (1 page).

English Abstract of JP 09-128189, published May 16, 1997, Fuji Xerox Co. Ltd. (16 pages).

English Abstract of JP 09-251371, published Sep. 22, 1997 (1 page).

* cited by examiner

COMPUTING DEVICE WITH IMPROVED USER INTERFACE FOR APPLICATIONS

CROSS-REFERENCE TO RELATED APPLICATIONS

This a continuation of pending U.S. application Ser. No. 13/860,143, filed on Apr. 10, 2013, which is a continuation of U.S. application Ser. No. 10/343,333, filed on Aug. 27, 2003 and issued as U.S. Pat. No. 8,424,020, which is the National Stage of International Application No. PCT/GB01/03387, International Filing date, Jul. 27, 2001, which designated the United States of America, and which International Application was published under PCT Article 21 (s) as WO Publication 02/10893 and which claims priority from, and benefit of, Great Britain Application No. 0019459.7, filed on Jul. 28, 2000, the disclosures of which are incorporated herein by reference in their entireties.

BACKGROUND

1. Field

The disclosed embodiments relate to a computing device with an improved user interface for applications. The term 'computing device' refers to any kind of device which can process and display information. The aspects of the disclosed embodiments have specific application to mobile telephones. The term 'mobile telephone' refers to any kind of mobile device with communications capabilities and includes radio (mobile) telephones, smart phones, communicators, PDAs and wireless information devices. It includes devices able to communicate using not only mobile radio such as GSM or UMTS, but also any other kind of wireless communications system, such as Bluetooth.

2. Brief Description of Related Developments

One of the problems facing the designers of computing devices with small screens is how to allow the user to navigate quickly and efficiently to access data and activate a desired function. Computing devices with small screens tend to need data and functionality divided into many layers or views: for example, the small display size of mobile telephones has conventionally meant that several hierarchies of functions have to be offered to a user. The interface can be thought of as having many layers, with the user having to first locate the correct top level function and then, within that function, progressively drill down (sometimes through 3 or more layers) to complete the required task. Where a mobile telephone includes several different applications (e.g. a message application, a contacts/address book application, a calendar application and a telephone application), then the user normally has to first of all locate, then start/open the required application and then may need to navigate to the required function (e.g. create a new contact entry) or cause the required stored data (e.g. display names beginning with the letter 'A') to be displayed. This process can seem slow, complex and difficult to learn, particularly to novice users.

Hence, with conventional user interfaces, a user may need to scroll around and switch views many times to find the right data/functionality. An effective user interface would ideally enable the user to readily and rapidly access the right data/functionality. Designing such an interface is however a complex human factors problem, especially for computing devices such as mobile telephones.

In some mobile telephones, a menu of several available options is displayed: the menu commands may then be divided into functional groups, with the most useful functional group at the top of the menu; the most useful command within that group is then placed at the top of group. In other devices, only one option is shown on the screen at any one time, making it harder for a user to appreciate the available options and therefore navigate effectively.

Some mobile telephones also offer limited shortcuts to get straight to a particular function. This usually involves memorising various keyboard input sequences, corresponding to different menu positions at different levels in the menu hierarchy. These shortcuts appeal only to a small number of expert users. Most mobile telephones also include idle screens (i.e. a display which is shown when the mobile telephone is switched on but not in use); these idle screens often carry alerting messages (e.g. "1 missed call").

On a more theoretical basis, a user interface typically has to demonstrate or make explicit the changing internal status of the mobile telephone as navigation proceeds. For example, to select or initiate a function (e.g. to open an address book function, enter a PIN security number or to alter the ring melody) a user has to understand (a) how to navigate to that function in order to select that function and (b) that the status of the telephone is such that the function can be selected or initiated. The technical problem of effectively enabling the user to understand this changing internal state has to date been inadequately addressed.

SUMMARY

The embodiments disclosed herein are directed to providing an improved form of user interface that addresses the problems stated above. According to a first aspect of the disclosed embodiments there is provided a computing device comprising a display screen, the computing device being able to display on the screen an application summary window, the summary window comprising a limited list of (i) common functions offered within an application and/or (ii) data stored in that application.

Hence, the presently disclosed embodiments envisage, in one implementation, a 'snap-shot' view of an application in which the snap-shot view brings together, in one summary window, a limited list of common functions and commonly accessed stored data.

Preferably, where the summary window for a given application shows data or a function of interest, the user can directly select that data or function; this causes the application to open and the user to be presented with a screen in which the data or function of interest is prominent. This saves the user from navigating to the required application, opening it up, and then navigating within that application to enable the data of interest to be seen or a function of interest to be activated.

In another aspect, there is a computer program which when running on a computing device (such as a mobile telephone), enables the device to operate in accordance with the above aspects of the disclosed embodiments. The program may be an operating system.

BRIEF DESCRIPTION OF THE FIGURES

The disclosed embodiments will be described with reference to the accompanying Figures, in which.

DETAILED DESCRIPTION

The presently disclosed embodiments offer, in one implementation, a snap-shot view which brings together, in one summary window, a limited list of common functions and commonly accessed stored data which itself can he reached directly from the main menu listing some or all applications. This yields many advantages in ease and speed of navigation, particularly on small screen devices. For example, a user can get to the summary window in just two steps—first, launch a main view which shows various applications; then, launch the appropriate summary window for the application of interest. This is far faster and easier than conventional navigation approaches. Once the summary window is launched, core data/functionality is displayed and can be accessed in more detail and can typically be reached simply by selecting that data/functionality. Hence, only three steps may be needed from start up to reaching the required data/functionality; navigating from between each step is clear and straightforward.

Figure 1:
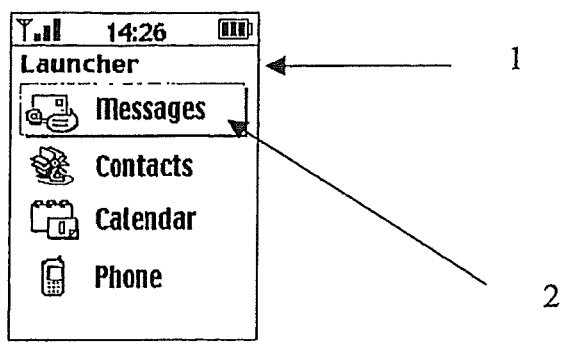
FIGS. 1-3 are screen shots showing an implementation of the disclosed embodiments.

As an example, the main view may be an Application Launcher for several applications such as 'Messages', 'Contacts', 'Calendar' and 'Phone'. The Application Launcher view is then presented as a standard scrolling list of application names with appropriate application icons next to them. The list is vertical and only one application is presented per line. Standard highlight functions apply in that when the Application Launcher view is opened the highlight defaults to the first item in the list of applications. This is shown in FIG. 1, in which the screen display 1 includes a list of applications ('Messages'; 'Contacts'; 'Calendar'; and 'Phone'), including a highlighted 'Messages' at 2. Alternatively, the highlight may default to the middle item in the list of applications. At this point, the user may take conventional navigation steps, such as scrolling, to move the highlight and using the available select function to navigate to the required highlighted application.

Figure 2:
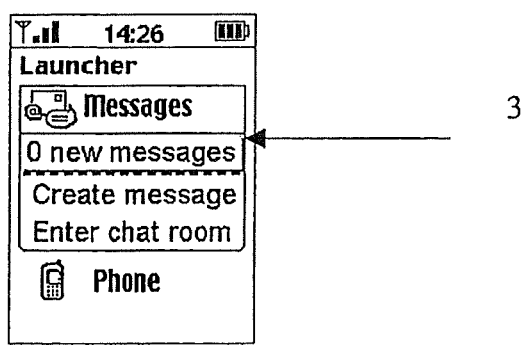
Figure 3:
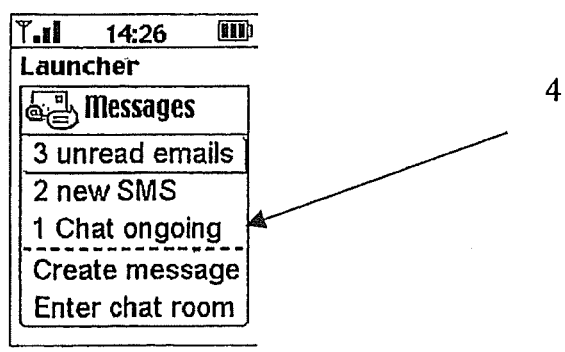

The innovative summary window functionality can be accessed as follows: should the highlight rest on the name of an application in the App Launcher for a certain amount of time (say a 1.2 second timeout), the summary window (the "App Snapshot") drops down from the highlight bar. The App Snapshot for any given application is a window which includes commonly requested data associated with that application and links to common functionality in that application. The App Snapshot is shown at 3 in FIG. 2, it includes the number of new messages ('0') and links to the two most common functions (as defined by the system designer, or selected by the user, or learned by the device) in the Messages application—'Create Messages' and 'Enter chat room'. In FIG. 3, a slightly longer App Snapshot is shown, indicating at 4 that there are '2 new SMS' messages and '1 Chat Ongoing'. Other selection processes could also be used (e.g. voice activation, softkey selection etc.) to access the App Snapshot. For example, the App Snapshot may be 'called' or 'fired' by using a right scroll function (if the mobile telephone has 4-way scrolling capacity); a press and hold of the select function when an application name is highlighted; or using a right cursor key on a highlighted application name.

A highlight is available in the App Snapshot dropdown which may be scrolled in order to select a required item, When an item in the App Snapshot is selected (e.g. by being highlighted and then selected using a conventional selection technique such as pressing a right cursor), the device displays the relevant data in the application details view, or displays the relevant screen offering the relevant functionality. The required application may be automatically opened when the item in the App Snapshot is selected. The App Snapshot can therefore display data from an application and functions of that application without actually opening the application up: only once a user has selected an item in the App Snapshot associated with a given application does that application have to be opened. For example, when 'Create Messages' in an App Snapshot is selected, then the messaging application is opened up; that application does not however have to be opened up prior to that stage.

Although the term 'window' has been used to describe the drop down summary, the summary does not have to be presented within any kind of frame. Any manner of presenting the common functions offered within an application and/or data stored in that application will constitute a 'window' as such.

The App Snapshot dropdown may be dismissed in the following ways:

If a timeout is used to call the App Snapshot, scrolling the highlight back to the relevant application name (i.e. back up to 'Messages' in FIG. 2 or 3) removes the App Snapshot. Scrolling down through the App Snapshot and off the end moves the highlight to the next application in the list (i.e. to 'Contacts' if the Messages App Snapshot has been scrolled through).

If scroll functions (e.g. right scroll) call the App Snapshot the opposite scroll function removes the snapshot.

When a user scrolls off the end of the App Snapshot, the main list from which the App Snapshot was opened de-compresses to regain the display estate that was taken up by the App Snapshot (i.e. the screen reverts to that shown FIG. 1). If the user has scrolled up back to the application name (so that the highlight moves up), this application name stays where it was and the next main list item draws back up to abut it. If the user scrolls off the end of the App Snapshot, the highlight moves down to the next item in the main list and this item together with the highlight move up the screen to regain the App Snapshot estate (i.e. taking the place of the App Snapshot).

Another caveat regarding the main list is that when the App Snapshot opens, there will typically be one item in the main list above and below it to preserve context—(i.e. to reduce any feeling in the user of having been transported somewhere else in the UI. They have not gone anywhere yet; the App Snapshot is just showing where they could easily go to). Hence in FIG. 2, the term 'Launcher' remains at the top of the screen, and the word 'Phone' and its associated icon remains at the bottom.

App Snapshots are not intended to replace notifications, but to complement them by providing non-intrusive reminders for the user, as well as rapid shortcuts to key application functionality.

The mobile telephone may be able to learn what functionality and/or stored data types are most likely to be of interest to a given user and which should therefore be included in a summary view to any given user. Alternatively, the user or system designer may define the kinds of functionality and/or stored data to be included in the App Snapshot for a given application. The constituency of the App Snapshot can therefore vary as determined by the user and/or system designer and/or the usage patterns of the user. The consistent goal however is for the App Snapshot to show only the most useful views and states.

Another possible feature is that the constituency of the App Snapshot may vary with the environment in which the mobile telephone finds itself. For example, if the telephone is Bluetooth enabled, then there may be a Bluetooth application which has associated with it a summary window which lists the other Bluetooth devices in the vicinity.

A further possible feature is that the constituency of the App Snapshot may vary with the actions of the user. For example, if the mobile telephone has an active Calendar application, and the user opens the App Snapshot for Contacts, then the Contacts App Snapshot may include contact information for parties in the previously or currently open Calendar application. But if the user opened the Contacts App Snapshot when the Phone application was current, then the Contacts App Snapshot may instead include contact information of the most called party, or a missed call party, or a party whose call the user is auto-replying to.

In a Messages view, when the highlight rests on a message entry, further information on that message becomes visible such as date and time it arrived and the first line/subject of the message. Rather than an App Snapshot opening here, the highlight expands to cover this extra information as well as the list item. It does this here because the extra information displayed is not 'fireable' like App Snapshot items in the application switcher.

In the Contacts manager, the App Snapshot opens (using whatever mechanism is implemented) to display phone numbers and email addresses which may be 'fired' (i.e. a phone number is dialed, an email address is seeded into a new message). The Contacts manager can have a base view—a list of names of the people stored in a device. It opens to show usable contact details like phone numbers and email addresses for each contact so you can initiate communication from here rather than navigating further within the Contacts Manager application. For example, the contact John Smith would have a snapshot which expands to show his phone number and email address. A user can scroll to the email address and hit the select button—the display then changes to a new email form seeded with his email address and all the user need do is input some body text and hit a 'Do It' button.

The presently disclosed embodiments can also be used in systems which do not have a concept of separate applications as such. Then, the snapshot views are then views of commonly used functions and/or data, selected by the system designer, user or through a machine learning process.

As explained above, the disclosed embodiments are particularly useful for mobile telephones because of their user interface constraints. However, they may also be used in environments outside of mobile telephony. For example, desktop and laptop PCs may also benefit from the disclosed embodiments. The disclosed embodiments may therefore be used in any computing environment, including both keyboard and keyboard-less devices.

It should be understood that the foregoing description is only illustrative of the aspects of the disclosed embodiments. Various alternatives and modifications can be devised by those skilled in the art without departing from the aspects of the disclosed embodiments. Accordingly, the aspects of the disclosed embodiments are intended to embrace all such alternatives, modifications and variances that fall within the scope of the appended claims. Further, the mere fact that different features are recited in mutually different dependent or independent claims does not indicate that a combination of these features cannot be advantageously used, such a combination remaining within the scope of the aspects of the disclosed embodiments.

What is claimed is:

1. A computing device comprising a display screen, the computing device being configured to display on the screen a menu listing one or more applications, and additionally being configured to display on the screen an application summary that can be reached directly from the menu, wherein the application summary displays a limited list of data offered within the one or more applications, each of the data in the list being selectable to launch the respective application and enable the selected data to be seen within the respective application, and wherein the application summary is displayed while the one or more applications are in an un-launched state.

2. The computing device of claim 1 in which an application launcher lists names and/or icons of several applications and selecting a name or icon causes the summary for that application to be opened.

3. The computing device of claim 1 in which the kinds of content of a summary for a given application is selected using a process in which the device learns what data types are of interest to any given user.

4. The computing device of claim 1 in which a user can define what data types are of interest to that user for the summary for an application.

5. The computing device of claim 1 in which the data type for a summary for a given application varies with the environment of the device.

6. The computing device of claim 1 in which the data type for a summary for a given application varies with the actions of a user.

7. The computing device of claim 1 in which the summary is a frame which includes the name of the one or more applications.

8. The computing device of claim 1 in which the summary further displays a limited list of functions offered in the one or more applications.

9. The computing device of claim 1, being a mobile telephone.

10. The computing device of claim 1, being a PC.

11. A computer program product comprising a non-transitory computer-readable storage medium having computer-readable code embodied in the medium which, when running on a computing device, causes the computing device to display on a screen of the device a menu listing one or more applications, and additionally causes the device to display on the screen an application summary that can be reached directly from the menu, wherein the summary displays a limited list of data offered within the one or more applications, each of the data in the list being selectable to launch the respective application and enable the selected data to be seen within the respective application, and wherein the application summary is displayed while the one or more applications are in an un-launched state.

12. The computer program product of claim 11, wherein the computer-readable code comprises an operating system program.

13. The computer program product of claim 11, wherein the computer-readable code is operable to cause the screen to display an application launcher which lists the names and/or icons of several applications, wherein selecting a name or icon causes the summary for that application to be opened.

14. The computer program product of claim 11, wherein the computer-readable code enables the kinds of content of a summary for a given application to be selected using a process in which the device learns what data types are of interest to any given user.

15. The computer program product of claim 11, wherein the computer-readable code enables a user to define what data types are of interest to that user for the summary for an application.

16. The computer program product of claim 11, wherein the computer-readable code enables the data types for a summary for a given application to vary with the environment of the device.

17. The computer program product of claim 11, wherein the computer-readable code enables the data types for a summary for a given application to vary with the actions of a user.

18. The computer program product of claim 11, wherein the computer-readable code enables the summary to be a frame which includes the name of the one or more applications.

19. The computer program product of claim 11, wherein the computer-readable code enables the summary to further display a limited list of functions offered in the one or more applications.

20. A method comprising:
   displaying, on a computing device having a display screen, a menu listing one or more applications;
   displaying an application summary that can be reached directly from the menu, wherein the application summary displays a limited list of data offered within the one or more applications, wherein the application summary is displayed while the one or more applications are in an un-launched state; and
   in response to a user selection of particular data, launching the respective application associated with the selected data to enable the selected data to be seen within the respective application.

21. The method of claim 20, further comprising listing names and/or icons of the one or more applications and upon selecting a name or icon, opening the application summary for the associated application.

22. The method of claim 20, further comprising learning data types of interest to a user and selecting content of the application summary based on the learned data types of interest.

23. The method of claim 20, further comprising selecting content of the application summary based on data of interest to a user.

24. The method of claim 20, further comprising selecting content of the application summary based on data usage patterns.

25. The method of claim 20, further comprising selecting content of the application summary according to a user definition.

26. The method of claim 20, further comprising varying content of the application summary according to an environment of the computing device.

27. The method of claim 20, further comprising varying content of the application summary according to user actions.

28. The method of claim 20, further comprising displaying the application summary as a frame including a name of the one or more applications.

29. The method of claim 20, further comprising displaying in the application summary a limited list of functions offered in the one or more applications.

\* \* \* \* \*

UNITED STATES PATENT AND TRADEMARK OFFICE
CERTIFICATE OF CORRECTION

PATENT NO. : 8,713,476 B2  Page 1 of 1
APPLICATION NO. : 14/063544
DATED : April 29, 2014
INVENTOR(S) : Martyn It is certified that error appears in the above-identified patent and that said Letters Patent is hereby corrected as shown below:

In the Specification
Column 1, Line 7, "This is continuation" should read --This is a continuation--
Column 1, Line 10, "8,424,020" should read --8,434,020--

Signed and Sealed this
Eighteenth Day of November, 2014

Michelle K. Lee
*Deputy Director of the United States Patent and Trademark Office*